United States Patent

[11] 3,593,672

| [72] | Inventors | Henry D. Breen<br>Chicago;<br>Russell M. Loomis, Palos Heights, both of, Ill. |
|---|---|---|
| [21] | Appl. No. | 719,551 |
| [22] | Filed | Apr. 8, 1968 |
| [45] | Patented | July 20, 1971 |
| [73] | Assignee | Unarco Industries, Inc.<br>Continuation-in-part of application Ser. No. 612,611, Jan. 30, 1967, now Patent No. 3,477,392, Continuation-in-part of application Ser. No. 615,139, Feb. 10, 1967, now Patent No. 3,431,015. |

[54] APERTURED PANEL WITH TINE-GRIPPING MEANS
17 Claims, 17 Drawing Figs.

[52] U.S. Cl. .................................................. 105/376,
105/371, 214/621
[51] Int. Cl. .................................................. B61d 45/00,
B60p 7/14
[50] Field of Search .......................................... 105/376,
370, 371, 369 B; 214/620, 621; 296/24; 108/54

[56] References Cited
UNITED STATES PATENTS

| 3,059,796 | 10/1962 | Dansereau | 214/621 X |
| 2,490,772 | 12/1949 | Benner | 214/620 |
| 2,256,454 | 9/1941 | Bomar | 214/621 X |
| 2,550,219 | 4/1951 | Bollinger | 214/620 X |
| 2,584,240 | 2/1952 | Stewart | 214/620 X |
| 2,707,573 | 5/1955 | Balwics | 214/621 |
| 3,013,684 | 12/1961 | King et al. | 214/620 |
| 3,229,836 | 1/1966 | Koenig | 214/621 X |
| 3,352,595 | 11/1967 | Bezlaj | 296/24 |
| 3,448,880 | 6/1969 | Howard | 214/620 |

Primary Examiner—Drayton E. Hoffman
Attorney—Narman Lettvin

ABSTRACT: A panel for separating lading is provided with spaced ports in its face adapted to receive therein the tips of a forklift truck's tines, and means are provided in the ports for gripping said tines to prevent the panel from falling when the tines lift the panel. The gripping device is mechanically actuated into a positive gripping relationship with tines of a forklift truck when the tines are inserted in the ports and when the panel is lifted in a vertical position by the tines and supported thereby. When the panel is no longer supported by the tines, the gripping devices may be moved or move out of gripping relationship with the tines and the tines then may be easily removed from the ports.

INVENTORS
HENRY D. BREEN
& RUSSELL M. LOOMIS
ATTORNEYS

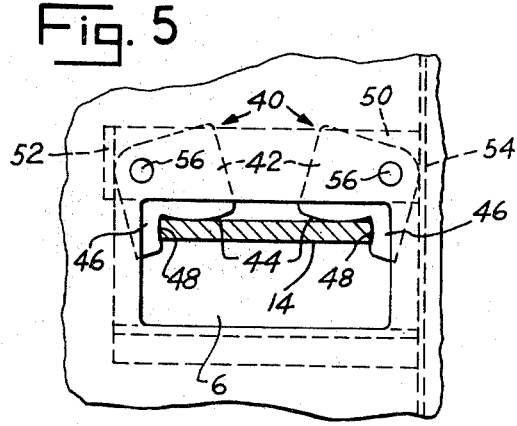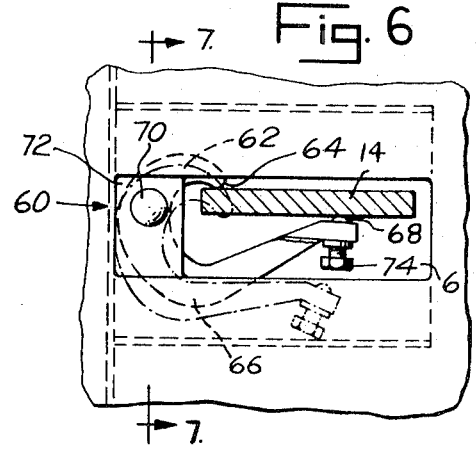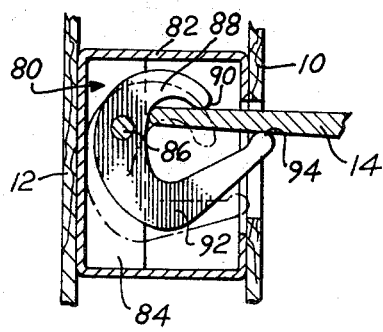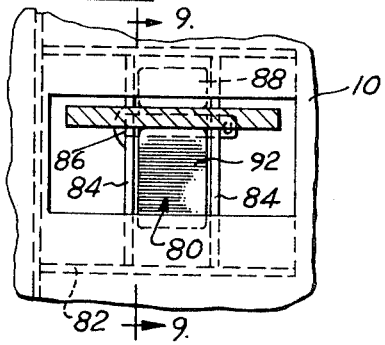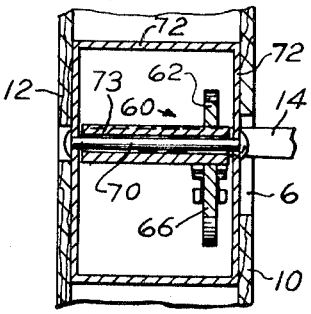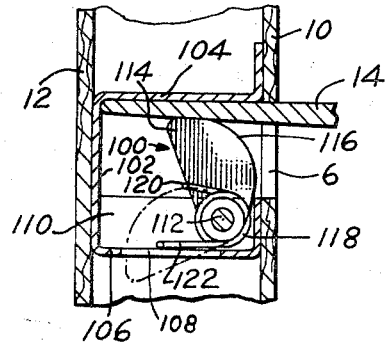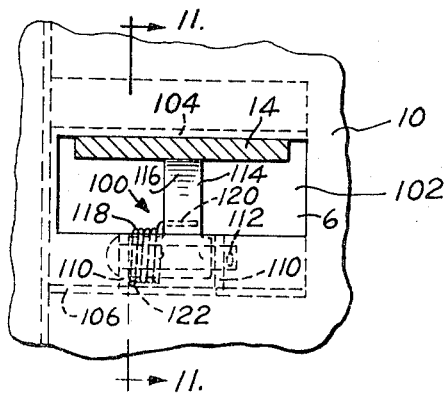
INVENTORS
HENRY D. BREEN
BY & RUSSELL M. LOOMIS
*Bair, Freeman & Molinare*
ATTORNEYS

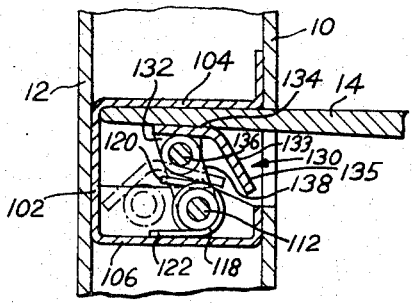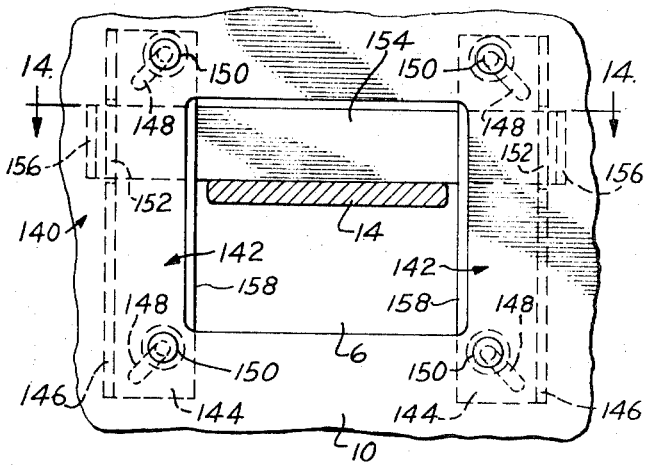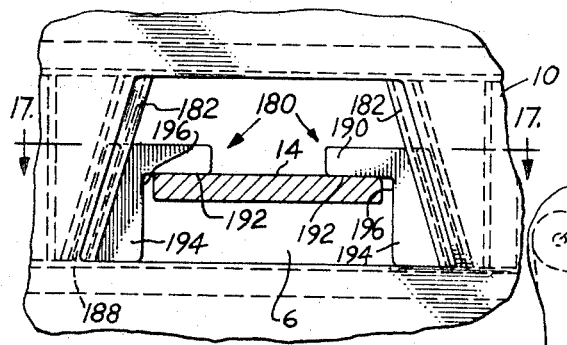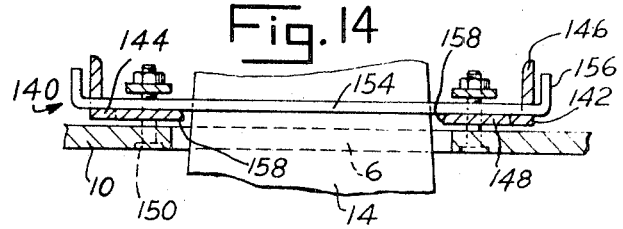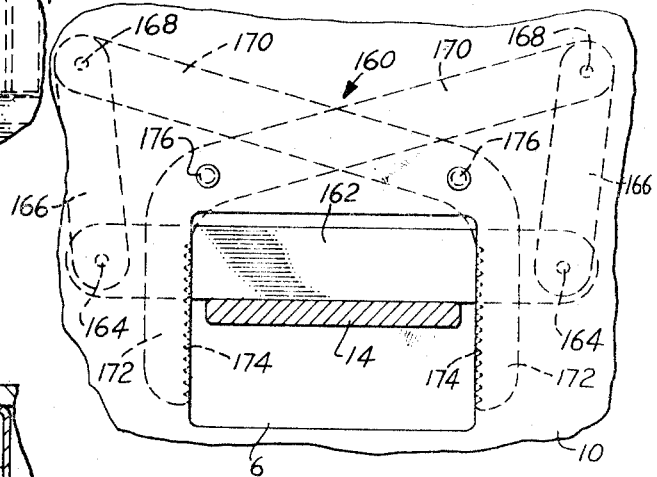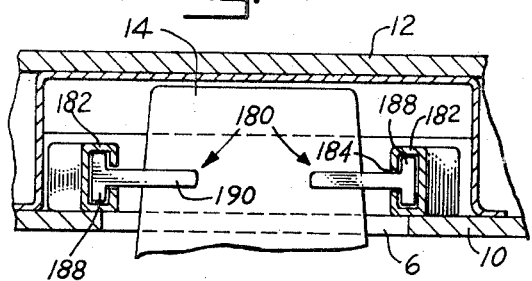

3,593,672

APERTURED PANEL WITH TINE-GRIPPING MEANS

RELATED APPLICATIONS

This application is related to our copending applications, Ser. No. 612,611, filed Jan. 30, 1967 now U.S. Pat. No. 3,477,392 and to Ser. No. 615,139, filed Feb. 10, 1967 now U.S. Pat. No. 3,431,015. Insofar as there is common subject matter, this application is a continuation-in-part of said applications.

BACKGROUND OF THE INVENTION

This invention relates to an improved load-separating panel with automatic tine grippers, and more particularly relates to a panel intended to be lifted substantially vertically or at an upright attitude by a forklift truck's tines, which are automatically gripped by means on the panel to prevent the panel from falling from said tines during transport of the panel at an upright attitude by the forklift truck.

In said applications, lading-separating panels are disclosed which may be disposed either vertically or horizontally in a shipping car to separate and protect the cargo from damage during shipping. Such separating panels are adapted to be transported and finally positioned in the shipping car in their vertical or upright disposition by a forklift truck. To provide for such transport and positioning, ports are located in the faces of the panel. The tines of the forklift truck are inserted in the ports and the panel is lifted and supported by the tines during the transport and positioning.

The tine ports may extend from one face to the other face of the panel, as disclosed in the aforementioned applications. Alternatively, the ports on each face may be staggered to block the opposite side of each port to prevent passage of the tines completely through the panel and possible damage resulting therefrom to the cargo already loaded when the panel is being positioned in the shipping car. In either instance, the vertically disposed panel is prevented from falling off the tines only by the frictional engagement of a portion of the peripheries of the panel's ports with the tine surfaces. Thus, particularly where the ports are staggered or where the lifting surface of the tines is not flat, or where the tine tips are not square as by being tapered or having rounded corners, accidental striking of the panel's edges or vibration of the panel during transport may cause the panel to inadvertently fall off the tines of the truck. Damage to personnel, cargo or the panel itself may result from such a fall, since the panels are frequently of substantial size and weight.

Accordingly, the invention includes as one of its principal objects, a new and improved panel which positively grips the tines of a forklift truck, particularly adjacent the tips thereof, to prevent inadvertent dropping of the panel off forklift truck tines during transport or positioning.

Also an object of the invention is to provide a new and improved lading panel with a tine-gripping means which is arranged to be actuated to lock upon positioning the tine in lifting position or upon lifting of the panel and which is arranged to effect release of the tine-gripping means upon movement of the tine away from lifting position, thus rendering manual positioning, locking or releasing of the gripping means unnecessary.

SUMMARY OF THE INVENTION

In a principal aspect, the invention comprises gripping means disposed adjacent one or more of the tine ports in the face of a lading-separating panel. The gripping means is arranged such that when the tines of a forklift truck are inserted in the ports and the panel is vertically lifted, the gripping means is actuated to grip the tines and prevent the inadvertent falling of the panel off the tines.

The above as well as other objects, features and advantages of the invention will become evident when considering the following description.

BRIEF DESCRIPTION OF THE DRAWINGS

In the course of the description, the drawings will be frequently referred to in which:

FIG. 5 is a view into the port of another embodiment of the present invention;

FIG. 6 is a view into the port of still another embodiment of the present invention;

FIG. 7 is an elevation cross-sectioned view of the embodiment of FIG. 6 taken along line 7-7 of that figure;

FIG. 8 is a view into the port of another embodiment of the present invention;

FIG. 9 is an elevation cross-sectioned view of the embodiment of FIG. 8 taken along line 9-9 of that figure;

FIG. 10 is a view into the port of another embodiment of the present invention;

FIG. 11 is an elevation cross-sectioned view of the embodiment of FIG. 10 taken along line 11-11 of that figure;

FIG. 12 is an elevation cross-sectioned view of another embodiment of the present invention;

FIG. 13 is a view into the port of another embodiment of the present invention;

FIG. 14 is a plan cross-sectioned view of the embodiment of FIG. 13 taken along line 14-14 of that figure;

FIG. 15 is a view into the port of still another embodiment of the present invention;

FIG. 16 is a view into the port of another embodiment of the present invention; and FIG. 17 is a plan cross-sectioned view of the embodiment of FIG. 16 taken along line 17-17 of that figure.

DESCRIPTION OF THE PREFERRED EMBODIMENTS

Figure 1:
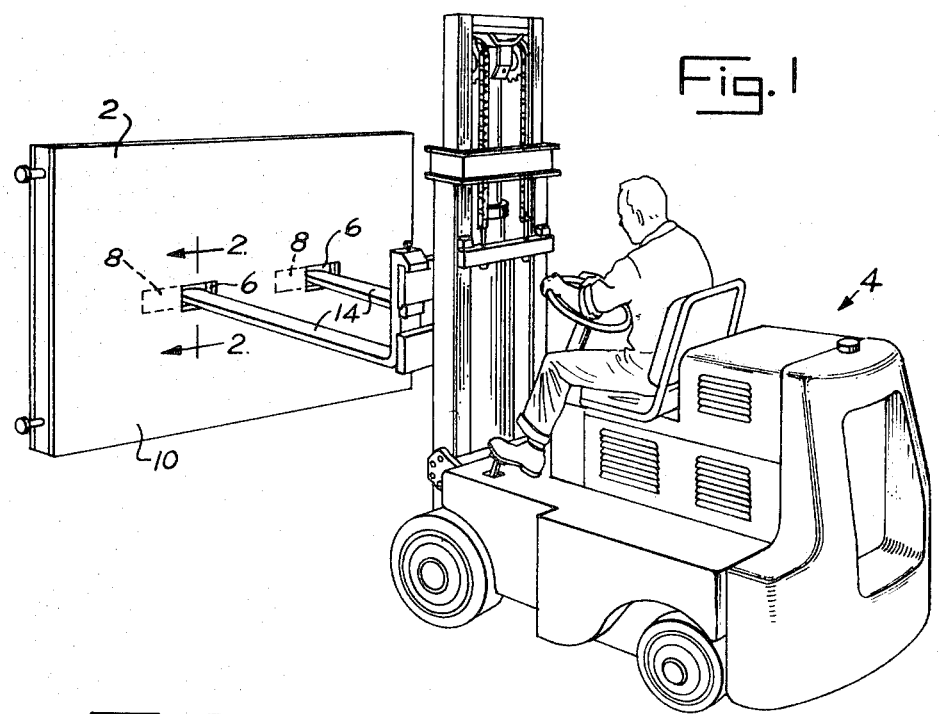
FIG. 1 is an overall view of the panel of the present invention being moved by a forklift truck.

Referring to FIG. 1, the overall panel 2 of the present invention is shown being transported by a forklift truck 4. The panel shown in FIG. 1, is a lading-separating panel which includes suitable ancillary structure to enable the panel to be locked into a shipping car in a vertical position to protect the lading therein. Such ancillary structure is not shown since it is not deemed to be part of the subject matter of the present invention. Suitable ancillary structure is shown in the aforementioned U.S. Pat. applications. The panel includes a pair of ports 6 and 8 in each of its vertical faces 10 and 12, the ports being separated by a distance which is substantially identical to the separation of the tines 14 of a standard forklift truck. The respective ports 6 and 8 on each face may be staggered, as shown in FIG. 1, such that the face opposite each of the ports acts to block the tines from passing completely through the panel. This staggered disposition of the ports prevents the tines 14 from projecting completely through the panel and causing the inadvertent damage of cargo already loaded in the shipping car when the panel is being positioned in the shipping car. In the alternative, ports on each face of the panel may be in registry enabling the tines to pass completely through the panel. In either port disposition, and especially where the ports are staggered and only the tips of the tines enter the ports, the panel is susceptible to the accidental falling off the tines 14. For example, if while transporting the panel, the top of the panel inadvertently strikes an overhead beam or fixture, the bottom of the panel strikes an object on the floor, or if the sides of the panel strike an object, the panel will tend to pivot and fall off the tines of the forklift truck. Moreover, the vibration of the forklift truck and panels during transport will tend to cause the panel to creep along the tines thus, in all probability, causing the panel to fall of the tines. The tendency of the panel to fall is particularly evident when considering that the panel is held upon the tines only by the frictional engagement between the upper edges of the ports 6 or 8 and the top surfaces of the tines 14. Where the tines have other than the flat lifting surface shown in the drawings, the frictional engagement of the top lifting surfaces of the tines with the upper edges of the ports is even further reduced resulting in almost certain falling of the panel off the tines.

In order to prevent the inadvertent falling of the panel off the tines, my invention provides a panel having gripping means arranged at the ports to positively grip the tines 14 of the forklift truck when the panel has been lifted and supported thereby.

Figure 3:
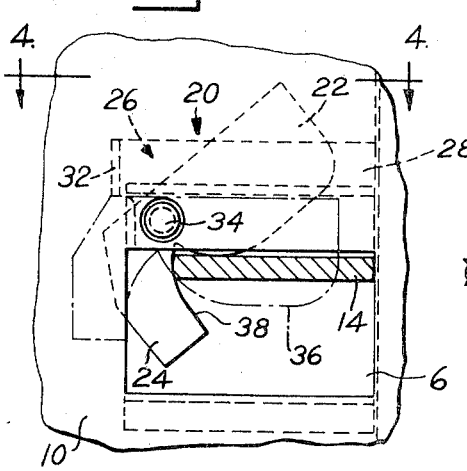
FIG. 3 is a view into one of the panel ports showing the embodiment of FIG. 2.
Figure 2:
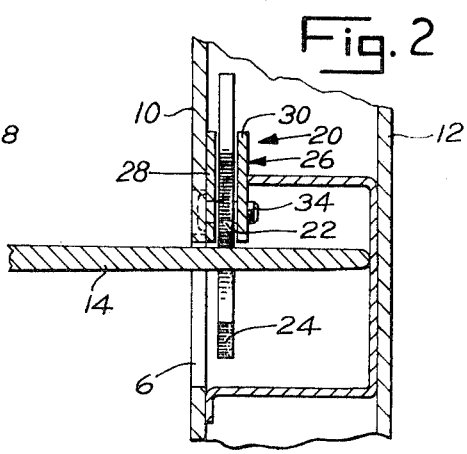
FIG. 2 is an elevation cross-sectioned view of one of the embodiments of the present invention taken along line 2-2 of FIG. 1.
Figure 4:
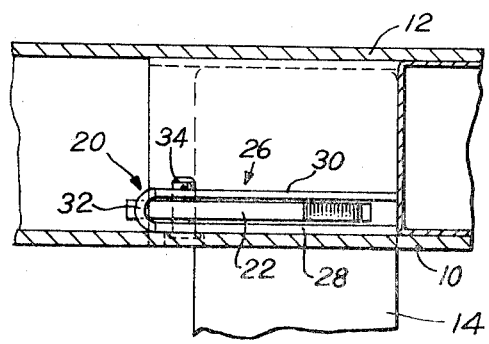
FIG. 4 is a plan cross-sectioned view of the embodiment of FIG. 2 taken along line 4-4 of that figure.

Referring to FIGS. 2—4, one embodiment of gripping arrangement is shown. The gripping device 20 is generally L-shaped and includes a one-piece trigger portion 22 and gripping portion 24. A U-shaped guide plate structure 26 is mounted between the faces 10 and 12 of the panel on the face 10 containing the port 6 and at the upper edge of the port. The guide plate structure 26 includes a pair of spaced parallel plates 28 and 30 connected to each other along one of their edges by a curved portion 32. One of the plates 28 is fixed to the back of face 10 of the panel and lies just above the upper edge of the port 6. The gripping device 20 is loosely positioned between the parallel plates 28 and 30 and a pin 34 passes through the panel's face 10, the two parallel plates 28 and 30 and the gripping device 20. The gripping device 20 is thereby adapted to pivot about the pin 34 between the parallel plates 28 and 30. The trigger portion 22 of the gripping device 20 includes a curved cam-shaped lift surface 36 and the gripping portion 24 includes a gripping surface 38 which is also somewhat curved, as best shown in FIG. 3. The overall gravitational moment arm of the gripping device 20 about the pin 34 caused by the location of the trigger portion 22 tends to rotate the gripping device in a clockwise direction, as viewed in FIG. 3. The curvature of the lift surface 36 and gripping portion 24 provide for a positive gripping action whether the tine 14 is narrow or wide. As viewed in FIG. 3, if the tine 14 is wider than that shown, the gripping surface 38 would merely engage the side of the tine earlier and in the final gripping position, the tine would be nearer the center of the port 6 rather than toward its top as shown. Thus, positive gripping is effected whether the tine is narrow or wide.

Before insertion of the tine 14, the gripping device 20 will be disposed in its lowermost position, depicted by the dot and dash lines in FIG. 3, by the gravitational clockwise rotation of the device. The clockwise rotation is limited when the upper edge of the gripping portion contacts the lower edge of the curved portion 32 of the guide plate structure 26. Thus, the trigger portion 22 is normally horizontally disposed and the lift surface 36 thereof is exposed within the outline of the port 6. The gripping portion 24 is generally vertically disposed and is clear of the outline of the port 6. When the tine 14 is inserted into the port 6 and is lifted, it contacts the lift surface 36 of the trigger portion 22 and the trigger portion 22 is lifted causing the entire gripping device 20 to rotate in a counterclockwise direction, as viewed in FIG. 3. As the gripping device 20 rotates counterclockwise, the gripping portion 24 enters the outline of the port 6 and the gripping surface 38 thereof approaches the side of the tine 14 positively gripping the tine and urging the tine to the right, as viewed in FIG. 3. The tine is urged to the right until its opposite side contacts the side edge of the port 6. The tine is now firmly gripped between the side edge of the port 6 and the gripping surface 38 of the gripping portion 24. The panel 2 is thereby prevented from falling off the tines of the truck during subsequent transport of the panel. When the panel has been positioned in its final vertical disposition and the weight of the panel is no longer supported by the tines, the tines 14 are lowered a slight amount causing the gripping device 20 to gravitationally rotate in a clockwise direction. As the gripping device 20 rotates clockwise, the gripping surface 38 withdraws from engagement with the side of the tine 14 thereby releasing its positive grip on the tine. The tine 14 may then be backed out of the port 6.

Another gripping arrangement embodiment is shown in FIG. 5. In this embodiment a pair of L-shaped gripping devices 40 are provided in the port. The L-shaped gripping devices 40 are substantially similar in construction to the L-shaped gripping device 20 shown in FIGS. 2—4. Each of the gripping devices 40 include a trigger portion 42 having a lift surface 44 and a gripping portion 46 having a gripping surface 48. The gripping devices 40 are loosely positioned between a guide plate structure 50 and rotation of the gripping devices 40 and their associated trigger portions 42 in a downward direction is limited by either engaging the inside of the curved portion 52 of the guide plate structure 50 or an inner structural member 54 of the panel. Pivot pins 56 extend through the guide plate structure 50 and the gripping devices 40 as previously described. The operation is substantially the same as the L-shaped gripping device 20 of FIGS. 2—4, except that the sides of the tine 14 are gripped between the two gripping surfaces 48 of the gripping portions 46 rather than between one gripping surface and the side edge of the port as in the previously described embodiment.

Another embodiment of the invention is shown in FIGS. 6 and 7. In this embodiment a gripping device 60 is provided having an overall shape which is of a curved C-shape. The gripping device 60 includes a trigger portion 62 having a lift surface 64 and a gripping portion 66 having a gripping surface 68. It should be noted that the U-shaped guide plate structure of the previously described embodiment has been dispensed with. A pivot pin 70 extends substantially through the thickness of the panel and is mounted directly between the faces of a housing 72 which, in turn is located between the panel faces 10 and 12. Rotatably disposed about the pin 70, is a concentric sleeve 73 upon which the gripping device 60 is integrally mounted. The gripping surface 68 may include an adjusting screw 74 for adjusting the point at which the gripping surface grips the tine 14. Due to the shape of the gripping device 60 and because both the gripping portion and the trigger portion 62 extend to the same side of the pivot pin 70, before insertion of the tine 14, the gripping portion 66 will rotate in a clockwise direction to a lower position, shown in dot and dash lines in FIG. 6, such that the gripping portion is below the lower edge outline of the port 6. The extent of rotation is limited by the contact of an edge of the gripping device 60 with the sidewall of the housing 72. When the gripping portion 66 is rotated to its lower position, the trigger portion 62 is also rotated downwardly within the outline of the port 6.

When the tine 14 is inserted into the port 6 and raised, it engages the lift surface 64 of the trigger portion 62 causing the gripping device 60 to rotate in a counterclockwise direction until the gripping surface 68 of the gripping portion 66 contacts the bottom surface of the tine 14 and the tine is gripped between the lifting surface 64 and the gripping surface 68. Again when the weight of the panel is no longer supported by the tines 14, the tines are lowered causing the gripping device 60 to rotate clockwise. The positive grip of the gripping device is thus relaxed and the tine may be withdrawn from the port.

Referring to FIGS. 8 and 9, another embodiment of the invention is shown. As best shown in FIG. 9, a gripping device 80 is disposed in a housing 82 which is located between the panel faces 10 and 12. The housing has a pair of spaced vertically disposed guide plates 84 toward the back of the housing. A pin 86 is inserted between the guide plates 84 and through the gripping device 80 loosely mounting the gripping device between the guide plates 84. The gripping device 80 is substantially C-shaped and includes a trigger portion 88 having a lift surface 90 and a gripping portion 92 having a gripping surface 94. Again due to the shape of the gripping device 80 and because the gripping portion 92 and the trigger portion 88 extend to the same side of the pivot pin 86, the gripping device 80 will rotate in a clockwise direction to a lower position before the tine 14 has been inserted and raised, as shown by the dot and dash lines in FIG. 9. Clockwise rotation of the gripping device 80 is limited by contact of the back of the gripping device 80 with the backwall of the housing 82.

When the tine 14 is inserted and lifted, its top surface engages the lift surface 90 rotating the gripping device 80 in a counterclockwise direction. Rotation continues until the gripping surface 94 contacts the bottom surface of the tine 14. Thus the tine is gripped between the lift surface 90 and the gripping surface 94 of the gripping device 80. Removal of the tine from the port is again effected merely by lowering the tine and withdrawing it from the port when the weight of the panel has been removed from the tines 14.

In FIGS. 10—12 two embodiments of wedge-type gripping devices are shown. Referring to the embodiment of FIGS. 10 and 11, a wedge-type gripping device 100 is located within a housing disposed between the panel faces 10 and 12 and is exposed within the outline of port 6. The housing 102 includes an upper wall 104 and a lower wall 106 having a slot 108 to accommodate passage of the gripping device 100 therethrough.

A pair of spaced guide plates 110 are disposed upon the lower wall 106 of the housing and bracket the slot 108 on each side. A pin 112 passes through the guide plates 110. The pin 112 loosely pivotally supports a camlike wedge 114 between the guide plates 110. The camlike wedge 114 has a curved gripping surface 116 facing the port. Disposed about the pin 112 is a coil spring 118 having one terminal end 120 engaging a side of the wedge 114 and the other terminal end 122 lying on the lower wall 106 of the housing.

Before the tine 14 is inserted in the port 6, the camlike wedge 114 is urged in a clockwise direction, as viewed in FIG. 11, upwardly against the top wall 104 of the housing 102 by the action of the coil spring 118. As the tine 14 is inserted into the port 6, the tine pushes the wedge 114 in a counterclockwise direction against the force exerted by the coil spring 118. The wedge 114 rotates in such counterclockwise direction until the tine has completed its longitudinal movement into the housing 102. If necessary, the wedge may rotate downwardly through the slot 108. The tine 14 is now raised until its top surface contacts the upper wall 104 of the housing. As the tine is lifted the wedge 114 rotates back in a clockwise direction due to the action of the coil spring 118. Thus, when the tine is lifted into contact with the upper wall 104 of the housing, it is positively gripped between the curved gripping surface 116 of the wedge and the upper wall 104 of the housing. It will be observed, that movement of the tine 14 to the right will only cause the wedge 114 to be dragged in a clockwise direction thereby increasing the positive gripping action. To remove the tine from the port when the panel is no longer being supported by the tine, the tine is first lowered causing the wedge 114 to again rotate in the counterclockwise direction. The tine is withdrawn to the right, as viewed in FIG. 11, from the port. When the tine is being withdrawn, the coil spring 118 urges the wedge 114 back in a clockwise direction toward the upper wall 104 of the housing 102.

Referring to FIG. 12, another embodiment of wedge-type gripping device 130 is shown. The construction and operation of this embodiment is similar in most respects to the camlike wedge-gripping device 100, previously described. However, in this embodiment the gripping portion 132, rather than being cam shaped, comprises an angled plate 133 having a gripping surface 134 and an overweighted tail portion 135, the plate 133 being pivotally attached at 136 to an arm 138. The arm 138 in turn, is pivotally attached to the pivot pin 112 about which the arm 138 and the gripping surface 134 rotate. By pivotally attaching the angled plate 133 at 136, the gripping surface 134 is always in flat contact with the tine 14 whether the tine is tapered or not. The overweighted tail portion 135 causes the plate 133 to rotate such that the tail portion is close to the terminal end 120 of the spring to maximize the space for entry of the tine 14 as is shown in the dot and dash lines in FIG. 12.

Referring to FIGS. 13 and 14, a sliding wedge-gripping device 140 is shown. In this embodiment, a pair of angle-gripping plates 142 are vertically disposed along the side edges of the port 6. The angle-gripping plates 142 includes a first portion 144 which is parallel to the plane of the port and a second portion 146 which extends perpendicular to the plane of the port. The first portions 144 of each plate includes a pair of the elongated inclined slots 148 sloping upwardly in the direction of the port 6. A plurality of pins 150 are affixed to the face 10 of the panel carrying the port 6 and extend through the elongated slots thus mounting the gripping plates 142 on the panel. The second portion 146 of each of the angle-gripping plates carries apertures 152 and a trigger bar 154 is inserted through each of the apertures. The ends 156 of the trigger bar 154 are bent to prevent the trigger bar from falling out of engagement with the gripping plates 142 due to transverse movement of either.

Before the tine is inserted in the port and raised, the trigger bar 154, as best seen in FIG. 13, is disposed in a lowermost position within the outline of the port 6. When the tine 14 is inserted in the port and raised, it engages the lower edge of the trigger bar 154, raising the trigger bar. As the trigger bar 154 is raised, it contacts the upper peripheries of the aperture 152 of the angle-gripping plates 142, lifting the gripping plates. Due to the pins 150 extending through the inclined slots 148, the path of travel of the gripping plates will be defined by the angle of incline of the slots 148. Thus, as the gripping plates are raised they move not only upwardly but toward the center of the port 6. Movement of the gripping plates continues until their leading edges 158 engage the sides of the tine thus gripping the tine between them. To remove the tine from the port when the weight of the panel is no longer supported by the tine, the tine is first lowered away from the trigger bar 154 causing the trigger bar to drop by gravity. As the trigger bar 154 drops, the gripping plates 142 also move downwardly and away from the sides of the port and the sides of the tine. The tine is thereby released and may be withdrawn from the port 6.

Referring to FIG. 15, another embodiment of gripping arrangement is shown. The gripping device 160 of this embodiment, includes a trigger bar 162 disposed horizontally across the top of the port 6. Pivotally connected at one of their ends to each end of the trigger bar 162 at 164, are a pair of upwardly extending links 166. The opposite end of each of the links 166 is pivotally connected at 168 to the ends of a set of gripping levers 170, which, in turn, are angled at their opposite ends 172. Each of the angled opposite ends 172 form a gripping portion having a gripping surface 174 which lies vertically along the edges of the port 6. The angled gripping levers 170 are pivotally mounted to the inside of the panel face 10 by pivot pins 176 at the upper edge of the port 6.

As the tine 14 is inserted into the port 6 and lifted, the tine's top lifting surface engages the trigger bar 162 and raises it. As the trigger bar 162 is raised, the links 166, which are pivotally connected at 164 to the trigger bar's ends, are also raised and the weight of the panel is transmitted upwardly through the links. Since the opposite ends of the links 166 are pivotally connected at 168 to the angled gripping levers 170 which, in turn, are connected to pivot pins 176, the upper ends of the links 166 will tend to rotate toward the port. As the links 166 rotate and are displaced upwardly, the angled gripping levers 170 pivot about their pins 176 and their angled ends 172 and their respective gripping surfaces 174 rotate into the outline of the port positively gripping the sides of the tine 14. To remove the tine when it no longer supports the panel, the tine is lowered causing the trigger bar 162 to drop which, in turn, causes the gripping surfaces 174 to rotate out of engagement with the sides of the tine. The tine 14 is then withdrawn from the port 6.

Finally, referring to FIGS. 16 and 17, another embodiment of sliding wedge arrangement and gripping device 180 is shown. In this embodiment, a pair of angled slide rails 182 are disposed along the side edges of the port 6, the bottoms of the slide rails being spaced from each other by a greater distance than the tops of the rails. The slide rails 182 are generally tubular and each includes an elongated slot 184. A gripping device 180, having a T-shaped cross section, is slideably held by each of the slide rails 182 with the gripping device cross portions 188 located within the tubular slide rails 182. The gripping devices 180 each include a generally horizontal trigger portion 190 extending into the outline of the port and having a lift surface 192 and a generally vertical gripping portion 194 having a gripping surface 196.

During operation, the tine 14 is inserted into the port 6 beneath the horizontal trigger portions 190 of the gripping devices 180. As the tine is lifted, it engages the lift surfaces 192 of the trigger portions 190, lifting the trigger portions and the gripping devices 180. As the gripping devices 180 are raised, they slideably follow an upward path described by the angled slide rails 182 and the vertical gripping portion 194 and its associated gripping surface 196 of each gripping device move toward and positively engage the sides of the tines. To remove the tine 14 from the port 6, the tine is lowered causing the gripping devices 180 by gravity to move downwardly along the slide rails 182. Thus, the gripping surfaces 196 move away from the sides of the tine and the tine 14 may then be withdrawn from the port 6.

When considering the preceding description of the embodiments of the invention, it will be evident that the various embodiments of the present invention provide for positive and firm gripping of the tines. It should be noted that the gripping forces exerted by the various gripping devices described above, are quite large since the gripping action is directly effected by the dead weight of the panel, which may frequently range upward of 400 pounds. Thus, a substantial reduction of the probability of dropping of the panel off the tines by accident is realized. It should be evident from the foregoing description that, in operation, the gripping devices of the present invention are completely self-locking and self-releasing, thus, eliminating the necessity of manual manipulation during use. In each of the embodiments, the lifting action of the tine itself actuates the gripping action. When it is desired to withdraw the tine from the port, the mere lowering and withdrawal of the tine is sufficient to release the gripping action of the aforementioned gripping devices. Moreover, mere disposition of the panel in the vertical, is sufficient to arrange the gripping devices in a position to receive the tines. Thus, no preliminary manual positioning of the gripping device is necessary. It should also be noted, that since the entire gripping structure of the aforementioned embodiments of my invention is capable of disposition within the confines of the panel, the faces of the panel are free of protrusions or other irregularities which may result in cargo damage and allow the panel to be used in a horizontal position as a load carrying pallet.

Although the embodiment in FIG. 6 is the only embodiment which, as shown, includes an adjusting bolt, it is contemplated that adjusting means may be incorporated into any one of the other embodiments described. Moreover, each of the embodiments' gripping surfaces may be treated to have a high coefficient friction. For example, the gripping surfaces may be serrated as shown in FIG. 15. Also, the gripping surfaces, as well as the sides of the port, may be lined with rubber or other material having a high coefficient friction.

Although a gripping device housing (like housing 102 in FIG. 12) is shown but not described with respect to some of the embodiments, e.g. the embodiments of FIGS. 2—4, it is generally preferred that each of the embodiments include an appropriate housing. The housing generally acts to reinforce the panel in the port area where greater stresses are realized. Also, the backwall of the housing tends to reinforce the backface 12 of the panel preventing possible penetration of the panel by the tines. Moreover, the housing will operate to prevent entry of dirt and foreign matter between the panel faces.

Even though the various gripping devices have been described with respect to the ports 6 on one face of the panel only, it is contemplated that the ports 8 on the other face of the panel may also be provided with similar gripping devices. Thus, the protection provided by the gripping devices is realized when transporting the panel from either side. Moreover, where the cross section of the tines is other than rectangular as shown in the drawings, e.g. where the lifting surfaces of the tines are curved, the gripping devices prevent the almost certain falling of the panel off the curved, reduced-contact, tine-lifting surfaces.

While several different embodiments of the invention have been shown and described in detail, it should be understood that these are for the purpose of illustration only and are not to be taken as a definition of the scope of the invention, reference being had for this purpose to the claims.

What we claim is:

1. In a generally planar panel of the type for aiding in freight lading, and having on a generally planar face thereof at least one port adapted to receive therein the tine of a typical forklift loading truck that is used for lifting and carrying the panel, the improvement comprising, gripping means carried by said panel adjacent the port, said gripping means including a movable gripping part positioned to engage the tine, for effecting a frictional pressure grip against a portion of the tine, and means responsive to upward movement of the tine within the port, during lifting of the panel, for exerting a force upon and through said movable gripping part to effect a frictional gripping force by said gripping part against a portion of the tine to secure the panel on the tine.

2. A panel as in claim 1 wherein the means responsive to upward movement of the tine for exerting a gripping force through the movable gripping part includes a trigger part operatively connected to and movable with the movable gripping part, the trigger part being positioned to be engaged by a time moving upwardly within the port during lifting of the panel, and the effect of gravity being operative to restore the trigger and the movable gripping part when the forklift tine is lowered within the port.

3. A panel as in claim 1 wherein the means responsive to upward movement of the tine for exerting a gripping force through the movable gripping part includes a spring arranged to bias the movable part toward an upper portion of the port so that, when the tine abuts an upper portion of the port during lifting of the panel, the spring operates to clamp the movable member against the tine.

4. A panel as in claim 1 wherein the movable gripping part is arranged to pivot about an axis that lies transverse to the face of the panel in which the port is located.

5. A panel as in claim 1 wherein the movable gripping part is arranged to pivot about an axis that lies substantially parallel to the face of the panel in which the port is located.

6. A panel as in claim 1 wherein the trigger part and movable gripping part are portions of a bellcrank arranged to pivot about an axis located adjacent the port in the panel face.

7. A panel as in claim 1 wherein the movable gripping part is positioned and arranged to engage the underside of a forklift tine.

8. A panel as in claim 1 wherein the movable gripping part is positioned to engage one surface of the forklift tine and to urge the opposite surface of the tine against a portion of the panel surrounding the port to effect frictional clamping of the tine between the gripping part and the panel.

9. A panel as in claim 3 wherein the movable gripping part has a nonlinear tine-engaging surface, and the movable part is mounted to pivot about an axis that lies substantially parallel to the face of the panel, said pivot axis being eccentric to the nonlinear tine-engaging surface to accommodate tine portions of different thickness.

10. A panel as in claim 1 wherein the gripping means includes two spaced movable gripping parts that are normally spaced apart a distance to permit entry of a forklift tine therebetween, said gripping parts being movable toward each other to grip opposite edges of the tine when the tine moves upwardly during lifting of the panel by the tine.

11. A panel as in claim 10 wherein the two spaced movable gripping parts are each part of a bellcrank that is mounted to pivot about an axis that lies transverse to the face of the panel.

12. A panel as in claim 10 wherein the two spaced movable gripping parts are normally biased apart by gravity force.

13. A panel as in claim 10 wherein the two spaced movable gripping parts are upright elements, upwardly converging cam means operatively associated with the gripping parts to cause the upright elements to move toward each other as they are raised, and the means responsive to upward movement of the tine being at least one laterally extending member operatively associated with the upright elements to raise them to cause them to cam inwardly toward each other.

14. A panel as in claim 13 wherein the upright elements have inclined slots thereon slidably cooperating with pins mounted on the panel and extending into the slots.

15. A panel as in claim 13 wherein the upright elements have elongated rail followers defined thereon, and inclined guide rail means mounted on the panel and cooperating with the rail followers for controlling movement of the upright elements.

16. A panel as in claim 1 wherein the gripping means are located wholly within the plane of the panel so as to protect the gripping means from loads abutting the face of the panel and to provide no interference thereof with loading against the panel face.

17. A panel as in claim 6 wherein the bellcrank is shaped and arranged to simultaneously engage the upper and lower surfaces of a tine when the tine is lifting the panel.